US010866500B2

(12) United States Patent
Isomi et al.

(10) Patent No.: US 10,866,500 B2
(45) Date of Patent: Dec. 15, 2020

(54) PROJECTION APPARATUS

(71) Applicant: Panasonic Intellectual Property Management Co., Ltd., Osaka (JP)

(72) Inventors: Akira Isomi, Osaka (JP); Daisuke Tabata, Osaka (JP); Yuki Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/796,056

(22) Filed: Feb. 20, 2020

(65) Prior Publication Data

US 2020/0326619 A1 Oct. 15, 2020

(30) Foreign Application Priority Data

Apr. 12, 2019 (JP) ................. 2019-076140

(51) Int. Cl.
*G03B 21/608* (2014.01)
*B05B 1/00* (2006.01)
(Continued)

(52) U.S. Cl.
CPC ............ *G03B 21/608* (2013.01); *B05B 1/005* (2013.01); *B05B 1/30* (2013.01); *G03B 21/56* (2013.01);
(Continued)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS 3,567,116 A * 3/1971 Lindlof ................ B01F 5/0415
239/14.2
5,368,228 A * 11/1994 Adamson ............... B05B 1/267
239/18
(Continued)

FOREIGN PATENT DOCUMENTS

AU 2006203537 3/2007
CN 205055449 3/2016
(Continued)

OTHER PUBLICATIONS

Extended European Search Report dated Sep. 8, 2020 for the European Patent Application No. 20159687.1.

*Primary Examiner* — Clayton E. LaBalle
*Assistant Examiner* — Kevin C Butler
(74) *Attorney, Agent, or Firm* — Wenderoth, Lind & Ponack, L.L.P.

(57) ABSTRACT

A projection apparatus includes a plurality of two-fluid nozzles, a projection-apparatus-side-gas-flow-path, a gas valve, a projection-apparatus-side-liquid-flow-path, a liquid valve, a projector, a mist concentration measurer, and a controller. The controller starts and stops spraying of a mist by controlling the gas valve and the liquid valve on the basis of an image or a video projected onto a screen from the projector. The controller receives a signal indicating a mist concentration from the mist concentration measurer, starts and stops spraying of the mist by controlling the gas valve and the liquid valve on the basis of the received signal, and thus controls the mist concentration.

9 Claims, 12 Drawing Sheets

(51) Int. Cl.
  *B05B 1/30* (2006.01)
  *G09F 19/18* (2006.01)
  *G03B 21/62* (2014.01)
  *G03B 21/58* (2014.01)
  *G03B 21/60* (2014.01)
  *G03B 21/56* (2006.01)
(52) U.S. Cl.
  CPC ............ *G03B 21/58* (2013.01); *G03B 21/60* (2013.01); *G03B 21/62* (2013.01); *G09F 19/18* (2013.01)
(58) Field of Classification Search
  USPC ........................................................ 359/443
  See application file for complete search history.

(56) References Cited

U.S. PATENT DOCUMENTS

| | | | | |
|---|---|---|---|---|
| 5,445,322 A * | 8/1995 | Formhals | ............ | G03B 21/608 239/18 |
| 6,857,746 B2 * | 2/2005 | Dyner | ............ | G03B 21/608 239/18 |
| 8,567,954 B2 * | 10/2013 | Koehler | ............ | H04N 13/334 353/7 |
| 9,229,311 B2 * | 1/2016 | Yeremian | ............ | G03B 21/10 |
| 2010/0279191 A1 * | 11/2010 | Matsuura | ............ | H01M 8/0662 429/443 |
| 2011/0285964 A1 * | 11/2011 | Reichow | ............ | G03B 21/608 353/10 |
| 2014/0267903 A1 | 9/2014 | Gaims et al. | | |
| 2014/0320824 A1 * | 10/2014 | Kim | ............ | H04N 9/3182 353/30 |

FOREIGN PATENT DOCUMENTS

| | | | | |
|---|---|---|---|---|
| JP | 2001-179138 | 7/2001 | | |
| JP | 2001179138 | * 10/2001 | ............ | B05B 1/28 |
| JP | 2007-075547 | 3/2007 | | |
| JP | 2007-170422 | 7/2007 | | |
| JP | 2008-275304 | 11/2008 | | |
| JP | 2010-260498 | 11/2010 | | |
| JP | 5317706 | 10/2013 | | |
| JP | 2015-179130 | 10/2015 | | |
| JP | 2015179130 | * 10/2015 | ........... | G03B 21/608 |

* cited by examiner

FIG. 3

| PRESSURE OF WATER AT LIQUID SUPPLY PORT OF TWO-FLUID NOZZLE MPa | SPRAYING AMOUNT ml/min |
|---|---|
| $0.498_8$ | 0 |
| $0.499_3$ | 10 |
| 0.501 | 20 |
| 0.503 | 30 |
| 0.506 | 40 |
| 0.509 | 50 |
| 0.514 | 60 |
| 0.519 | 70 |
| 0.525 | 80 |
| 0.532 | 90 |
| 0.545 | 100 |

FIG. 4

| INSTALLATION HEIGHT OF TWO-FLUID NOZZLE m | SETTING PRESSURE IN LIQUID PRESSURE ADJUSTER MPa | PRESSURE OF WATER AT LIQUID SUPPLY PORT OF TWO-FLUID NOZZLE MPa | SPRAYING AMOUNT ml/min |
|---|---|---|---|
| 3.5 | 0.539 | 0.509 | 50 |
| 2.0 | 0.524 | | |
| 0.5 | 0.509 | | |

FIG. 6

| PRESSURE OF WATER AT LIQUID SUPPLY PORT OF TWO-FLUID NOZZLE MPa | SPRAYING AMOUNT ml/min |
|---|---|
| 0.206 | 0 |
| 0.222 | 10 |
| 0.238 | 20 |
| 0.254 | 30 |
| 0.270 | 40 |
| 0.286 | 50 |
| 0.302 | 60 |
| 0.318 | 70 |
| 0.334 | 80 |
| 0.350 | 90 |
| 0.366 | 100 |

FIG. 7

| INSTALLATION HEIGHT OF TWO-FLUID NOZZLE m | TWO-FLUID NOZZLE 11 | | | TWO-FLUID NOZZLE 11b | | |
|---|---|---|---|---|---|---|
| | SETTING PRESSURE IN LIQUID PRESSURE ADJUSTER MPa | PRESSURE OF WATER AT LIQUID SUPPLY PORT OF TWO-FLUID NOZZLE MPa | SPRAYING AMOUNT ml/min | SETTING PRESSURE IN LIQUID PRESSURE ADJUSTER MPa | PRESSURE OF WATER AT LIQUID SUPPLY PORT OF TWO-FLUID NOZZLE MPa | SPRAYING AMOUNT ml/min |
| 3.5 | 0.524 | 0.494 | 0 | 0.301 | 0.331 | 41 |
| 2.0 | | 0.509 | 50 | | 0.316 | 50 |
| 0.5 | | 0.524 | 78 | | 0.301 | 58 |

PROJECTION APPARATUS

BACKGROUND

1. Technical Field

The present disclosure relates to a projection apparatus realizing a fantastic and comfortable indoor space. Specifically, a liquid and a gas are mixed with each other by using a two-fluid nozzle, a mist in which the liquid is atomized is sprayed into an indoor space, an image or a video is projected onto a screen through the indoor space, and light of the image or the video is scattered in the mist.

2. Description of the Related Art

In recent years, a video projection method of using a mist has been developed, and applicability thereof in an art or an entertainment increases.

For example, as illustrated in FIG. 10, projection apparatus 1 disclosed in Japanese Patent Unexamined Publication No. 2015-179130 includes projector 2 and screen formation device 3 electrically connected thereto. As illustrated in FIG. 11, screen formation device 3 includes generator 301 and ejector 303 communicating with generator 301 via duct 302. Generator 301 has tank 307. Tank 307 is provided with opening 305 on one end surface. Duct 302 communicates with the other end surface of tank 307. For example, water 308 is stored in tank 307, and ultrasonic vibrator 309 is disposed in water 308. Light emitter 401 and light receiver 402 are respectively provided in generator 301 and ejector 303 in order to measure and manage the concentration of a mist. Screen formation device 3 can form a uniform mist screen, and can project an image onto the mist screen.

SUMMARY

According to the present disclosure, there is provided a projection apparatus that projects an image or a video onto a screen disposed in an indoor space.

The projection apparatus includes a plurality of two-fluid nozzles, a projection-apparatus-side-gas-flow-path, a gas valve, a gas supply source, a projection-apparatus-side-liquid-flow-path, a liquid valve, a liquid supply source, a liquid pressure adjuster, a projector, a mist concentration measurer, and a controller.

Each of the plurality of two-fluid nozzles mixes a liquid with a gas, and sprays a mist in which the liquid is atomized.

The projection-apparatus-side-gas-flow-path is a path through which the gas is supplied to the plurality of two-fluid nozzles.

The gas valve opens and closes the projection-apparatus-side-gas-flow-path.

The gas supply source supplies the gas to the projection-apparatus-side-gas-flow-path.

The projection-apparatus-side-liquid-flow-path is a path through which the liquid is supplied to the plurality of two-fluid nozzles.

The liquid valve opens and closes the projection-apparatus-side-liquid-flow-path.

The liquid supply source supplies the liquid to the projection-apparatus-side-liquid-flow-path.

The liquid pressure adjuster is provided at the projection-apparatus-side-liquid-flow-path between the plurality of two-fluid nozzles and the liquid valve.

The projector projects the image or the video onto the screen.

The mist concentration measurer measures a mist concentration in the indoor space in which the mist is sprayed.

The controller starts and stops spraying of the mist by controlling the gas valve and the liquid valve on the basis of the image or the video projected onto the screen from the projector. The controller receives a signal indicating the mist concentration from the mist concentration measurer, starts and stops spraying of the mist by controlling the gas valve and the liquid valve on the basis of the received signal, and thus controls the mist concentration.

BRIEF DESCRIPTION OF THE DRAWINGS

FIG. 3 is a diagram illustrating a relationship between pressure of water at a liquid supply port of the two-fluid nozzle and a mist spraying amount in Exemplary Embodiment 1;

FIG. 4 is a diagram illustrating a relationship between an installation height for the two-fluid nozzle and a setting pressure in a liquid pressure adjuster in Exemplary Embodiment 1;

FIG. 6 is a diagram illustrating a relationship between pressure of water at a liquid supply port of the two-fluid nozzle and a mist spraying amount in Exemplary Embodiment 2;

FIG. 7 is a diagram illustrating a relationship between an installation height for the two-fluid nozzle, and pressure of water and a spraying amount at a liquid supply port of the two-fluid nozzle in Exemplary Embodiment 2;

DETAILED DESCRIPTIONS

There is the need for a technique in which a mist in which a liquid is atomized is sprayed into an indoor space, an image or a video is projected onto a screen through the indoor space, and light of the image or the video is scattered in the mist such that the fantastic and comfortable indoor space is realized. To do so, a mist concentration in the indoor space is required to be within a predetermined range, and a mist concentration distribution in the indoor space is required to be uniform. In a case where the mist concentration in the indoor space is too low, light of an image or a video cannot be scattered in the indoor space. In a case where the mist concentration is too high, light of an image or a video is blocked by the mist, and thus cannot be projected onto a screen. In a case where the mist concentration in the indoor space is nonuniform, a portion where the mist concentration is low and a portion where the mist concentration is high are generated, and thus an image or a video cannot be projected as intended.

In the configuration disclosed in Japanese Patent Unexamined Publication No. 2015-179130, a mist screen with a locally high mist concentration can be formed, but a mist concentration in the indoor space cannot be controlled.

Hereinafter, the present exemplary embodiment will be described with reference to the drawings.

Exemplary Embodiment 1

Figure 1:
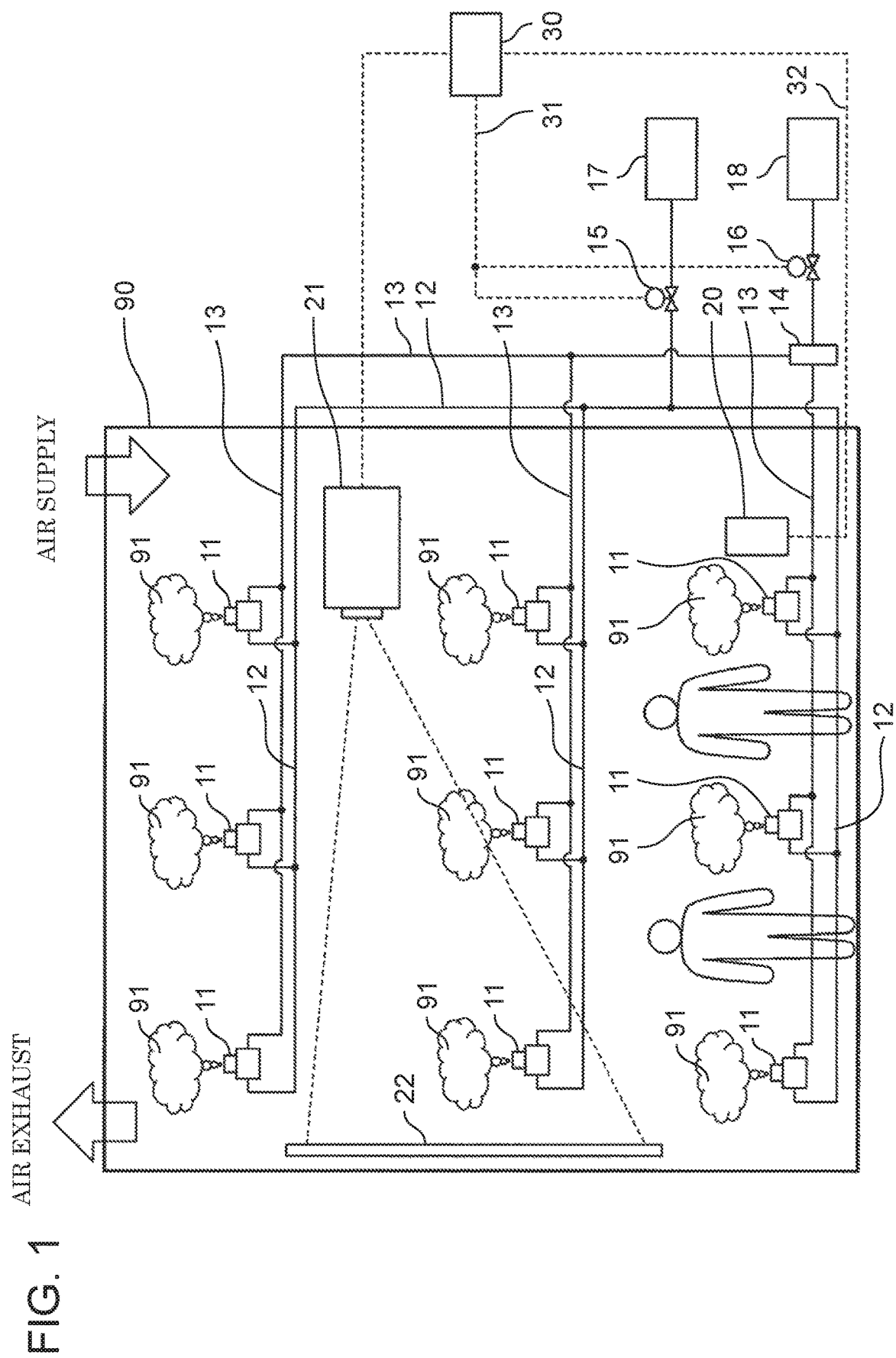
FIG. 1 is a diagram illustrating a configuration of a projection apparatus in Exemplary Embodiment 1.

FIG. 1 is a diagram illustrating a configuration of a projection apparatus in Exemplary Embodiment 1 of the present invention.

In FIG. 1, a projection apparatus includes two-fluid nozzle 11, projection-apparatus-side-gas-flow-path 12, projection-apparatus-side-liquid-flow-path 13, liquid pressure adjuster 14, gas valve 15, liquid valve 16, gas supply source 17, liquid supply source 18, controller 30, and mist concentration measurer 20, as main constituent elements for spraying mist 91. An image or a video is projected onto screen 22 from projector 21.

A plurality of two-fluid nozzles 11 are disposed in indoor space 90. For example, a plurality of two-fluid nozzles 11 at different heights may be disposed in indoor space 90. In FIG. 1, a plurality of two-fluid nozzles 11 at the smallest height are disposed on a floor surface on which people are present. A plurality of two-fluid nozzles 11 at three different heights are disposed for each group.

Single gas supply source 17 supplies a gas to each two-fluid nozzle 11 through projection-apparatus-side-gas-flow-path 12. An example of the gas is air.

Single liquid supply source 18 supplies a liquid to each two-fluid nozzle 11 through projection-apparatus-side-liquid-flow-path 13. An example of the liquid is water.

The liquid and the gas supplied to the two-fluid nozzle 11 are mixed with each other in the two-fluid nozzle 11, and thus the liquid is atomized. A mist obtained through atomization is sprayed into indoor space 90 from two-fluid nozzle 11.

As two-fluid nozzle 11, an internal mixing type nozzle may be used, a compressed gas and a pressurized liquid being supplied to the nozzle and being mixed in the nozzle such that the liquid is atomized.

The plurality of two-fluid nozzles 11 are provided in indoor space 90 at different heights for each group, and can thus make a mist concentration distribution in indoor space 90 uniform within a short period of time.

A specific example of two-fluid nozzle 11 will be described later.

As projection-apparatus-side-gas-flow-path 12 and projection-apparatus-side-liquid-flow-path 13, a metal tube such as a steel tube or a stainless steel tube, or a resin tube may be used.

Liquid pressure adjuster 14 may set a pressure of a supplied liquid for each group of two-fluid nozzles 11 of which installation heights are the same as each other.

As liquid pressure adjuster 14, a regulator or a needle valve may be used. A spraying amount of mist 91 sprayed from two-fluid nozzle 11 may be set by liquid pressure adjuster 14.

As gas supply source 17, for example, a compressor, a pump, or a blower that can supply a compressed gas with a pressure of 0.1 MPa to 1 MPa may be used. Gas supply source 17 may be a gas supply source that supplies a gas to projection-apparatus-side-gas-flow-path 12 under a predetermined pressure via a regulator or the like.

As liquid supply source 18, for example, a pump that can supply a liquid under a pressure of 0.1 MPa to 1 MPa may be used. Liquid supply source 18 may be a liquid supply source that supplies a liquid to projection-apparatus-side-liquid-flow-path 13 under a predetermined pressure via a regulator or the like. As liquid supply source 18, a pressurizing tank that can pressurize a liquid in a pressure container under a predetermined pressure by using a compressed gas so as to supply the liquid may be used.

Gas valve 15 is provided at projection-apparatus-side-gas-flow-path 12 between gas supply source 17 and two-fluid nozzle 11 closest to gas supply source 17 on projection-apparatus-side-gas-flow-path 12.

Gas valve 15 is connected to controller 30 via control wire 31. Gas valve 15 is opened and closed due to supply and non-supply of power from controller 30, and thus starts and stops supply of the gas to two-fluid nozzle 11 from gas supply source 17 via projection-apparatus-side-gas-flow-path 12.

Liquid valve 16 is provided at projection-apparatus-side-liquid-flow-path 13 between liquid supply source 18 and two-fluid nozzle 11 closest to liquid supply source 18 on projection-apparatus-side-liquid-flow-path 13.

Liquid valve 16 is connected to controller 30 via control wire 31. Liquid valve 16 is opened and closed due to supply and non-supply of power from controller 30, and thus starts and stops supply of the liquid to two-fluid nozzle 11 from liquid supply source 18 via projection-apparatus-side-liquid-flow-path 13.

As gas valve 15 and liquid valve 16, two-way electromagnetic valves may be used. As gas valve 15 and liquid valve 16, normal close valves that are closed during non-supply of power and are opened during supply of power may be used.

Mist concentration measurer 20 is disposed in indoor space 90. For example, mist concentration measurer 20 is disposed at a position separated from an air exhaust port and an air supply port of indoor space 90 in order to avoid the influence of air exhaust and air supply for indoor space 90. As an example, mist concentration measurer 20 is disposed in a space adjacent to the floor surface on which people are present. Mist concentration measurer 20 has a light transmitter and a light receiver. In a case where the light transmitter applies light to the space in which mist 91 is sprayed, the light is scattered by mist 91, and the scattered light is detected by the light receiver. The intensity of the scattered light detected by the light receiver depends on a mist concentration, and thus mist concentration measurer 20 can measure the mist concentration. The mist concentration may be represented by a sight distance (that is, visibility) at which a human can perform visual recognition.

As light applied from the light transmitter, near-infrared light that cannot be sensed by human eyes is preferably used. Mist concentration measurer 20 is preferably provided at a position where a mist concentration in indoor space 90 can be measured without being influenced by light of an image or a video projected from projector 21. Mist concentration measurer 20 is connected to controller 30 via signal wire 32, and transmits a signal indicating the mist concentration to controller 30.

As projector 21, a digital light processing (DLP) type projector, a liquid crystal projector, or a spotlight type projector may be used.

As screen 22, a matte finish fabric or a resin sheet coated with a paint may be used. A wall surface forming indoor space 90 may be used as screen 22.

The gas is supplied to two-fluid nozzle 11 by opening gas valve 15, and then spraying from two-fluid nozzle 11 is started by opening liquid valve 16. Liquid valve 16 is closed, and then spraying from two-fluid nozzle 11 is stopped by closing gas valve 15.

In order to increase the responsiveness of starting of spraying of two-fluid nozzle 11 and to prevent liquid leakage from two-fluid nozzle 11 during stopping of spraying, a check valve may be provided at projection-apparatus-side-liquid-flow-path 13 around two-fluid nozzle 11, and a liquid discharge valve and a liquid discharge flow path for setting a liquid pressure in projection-apparatus-side-liquid-flow-path 13 to an atmospheric pressure may be provided around downstream of liquid valve 16 of projection-apparatus-side-liquid-flow-path 13. For the same purpose, an electromagnetic valve or an air-operated valve may be provided at a liquid flow path around two-fluid nozzle 11.

Controller 30 outputs information regarding starting or stopping of projection of an image or a video to be projected, to projector 21. Controller 30 controls opening or closing of gas valve 15 and liquid valve 16 on the basis of information regarding an image or a video to be projected onto screen 22 from projector 21, and starts and stops spraying of mist 91. For example, controller 30 controls opening or closing of gas valve 15 and liquid valve 16 at a spraying starting time or a spraying stopping time set in advance for starting or stopping of projection of an image or a video, and thus starts or stops spraying of mist 91. Alternatively, as another example, controller 30 controls opening or closing of gas valve 15 and liquid valve 16 along with starting or stopping of projection of an image or a video, and thus starts or stops spraying of mist 91. Controller 30 receives a signal indicating a mist concentration from mist concentration measurer 20, controls opening and closing of gas valve 15 and liquid valve 16 on the basis of the received signal, and controls a mist concentration by starting and stopping spraying of mist 91. As a specific example of a control operation, controller 30 may control opening and closing of gas valve 15 and liquid valve 16 on the basis of information regarding an image or a video to be projected such that a mist concentration is increased or decreased, or a predetermined mist concentration is maintained, or may control opening and closing of gas valve 15 and liquid valve 16 on the basis of information in or a timing at which a specific image or video is projected. Regarding control of a mist concentration, the mist concentration may be controlled such that a visibility is within a predetermined range, for example, from 20 m to 50 m.

Figure 8:
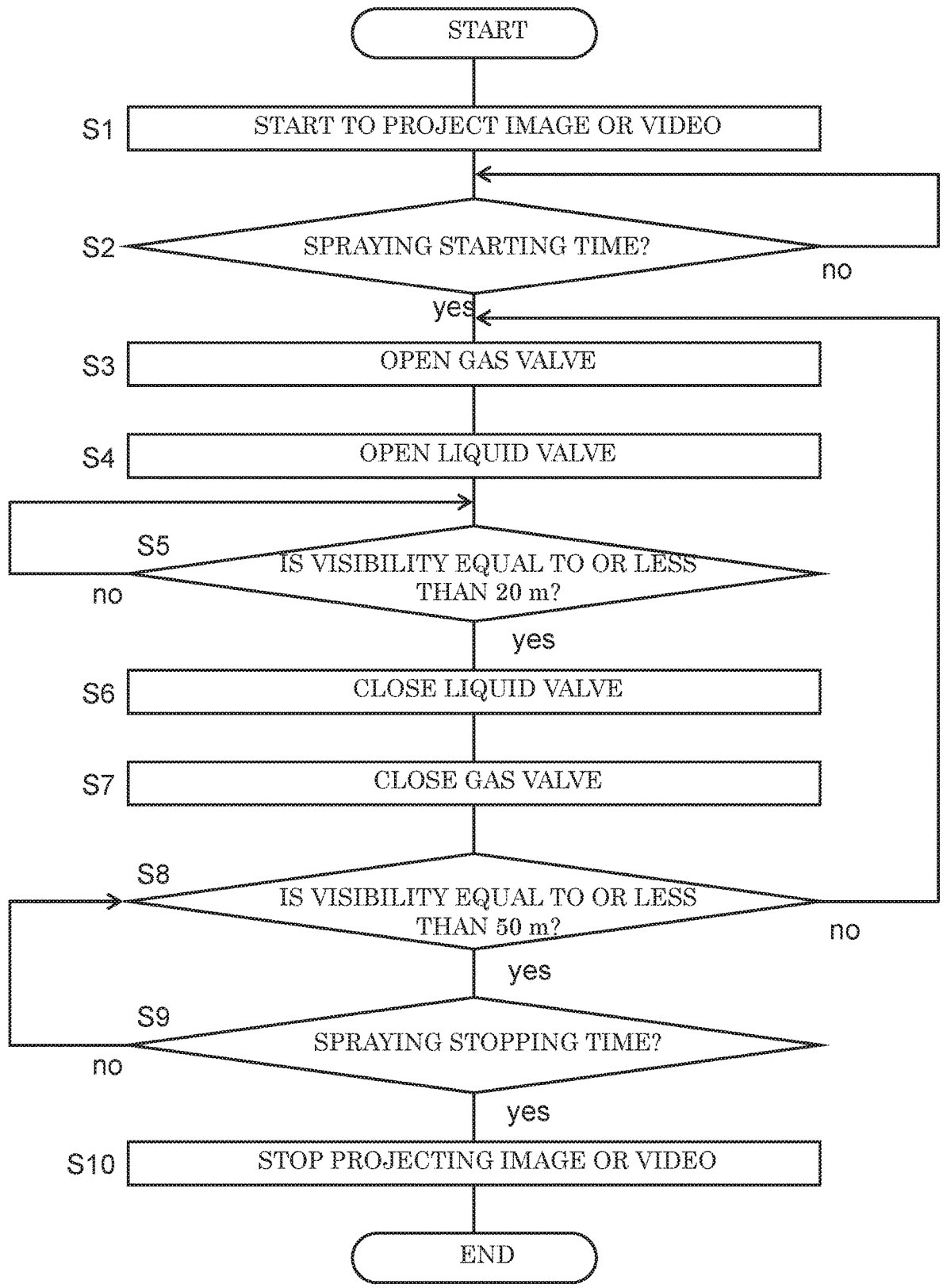
FIG. 8 is a flowchart illustrating an example of opening/closing control for a gas valve and a liquid valve due to projection of an image or a video and starting and stopping of mist spraying.

FIG. 8 is a flowchart illustrating an example of control of opening and closing of gas valve 15 and liquid valve 16 due to projection of an image or a video and starting and stopping of spraying of a mist under the control of controller 30.

First, in step S1, projection of an image or a video onto screen 22 from projector 21 is started under the control of controller 30.

Next, in step S2, controller 30 determines whether or not a spraying starting time set in advance comes. Controller 30 waits for the spraying starting time to come, and proceeds to step S3 after the spraying starting time comes.

Next, in step S3, gas valve 15 is opened under the control of controller 30.

Next, in step S4, liquid valve 16 is opened under the control of controller 30.

Next, in step S5, controller 30 receives a signal indicating a mist concentration from mist concentration measurer 20. Controller 30 determines whether or not a visibility is equal to or less than 20 m as an example of a first visibility threshold value as a reference for maintaining fantastic and comfortable indoor space 90 for a certain time, on the basis of the received signal. Controller 30 waits for the visibility to be equal to or less than 20 m in step S5, and proceeds to step S6 after the visibility is equal to or less than 20 in.

Next, in step S6, liquid valve 16 is closed under the control of controller 30.

Next, in step S7, gas valve 15 is closed under the control of controller 30.

Next, in step S8, controller 30 receives a signal indicating a mist concentration from mist concentration measurer 20. Controller 30 determines whether or not a visibility is equal to or less than 50 m as an example of a second visibility threshold value as a reference for continuously maintaining fantastic and comfortable indoor space 90, on the basis of the received signal. In a case where the visibility is equal to or less than 50 m, controller 30 determines that fantastic and comfortable indoor space 90 is maintained, and proceeds to step S9. In a case where the visibility is not equal to or less than 50 m, controller 30 returns to step S3 in order to increase a mist concentration.

Next, in step S9, controller 30 determines whether or not a spraying stopping time set in advance comes. In a case where the spraying stopping time does not come, controller 30 returns to step S8. In a case where the spraying stopping time comes in step S9, controller 30 proceeds to step S10.

Next, in step S10, projection of an image or a video onto screen 22 from projector 21 is stopped under the control of controller 30.

Here, the visibility of 20 m and the visibility of 50 m are respective examples of the first visibility threshold value and the second visibility threshold value as determination references for a control operation, and are not limited thereto.

Figure 9:
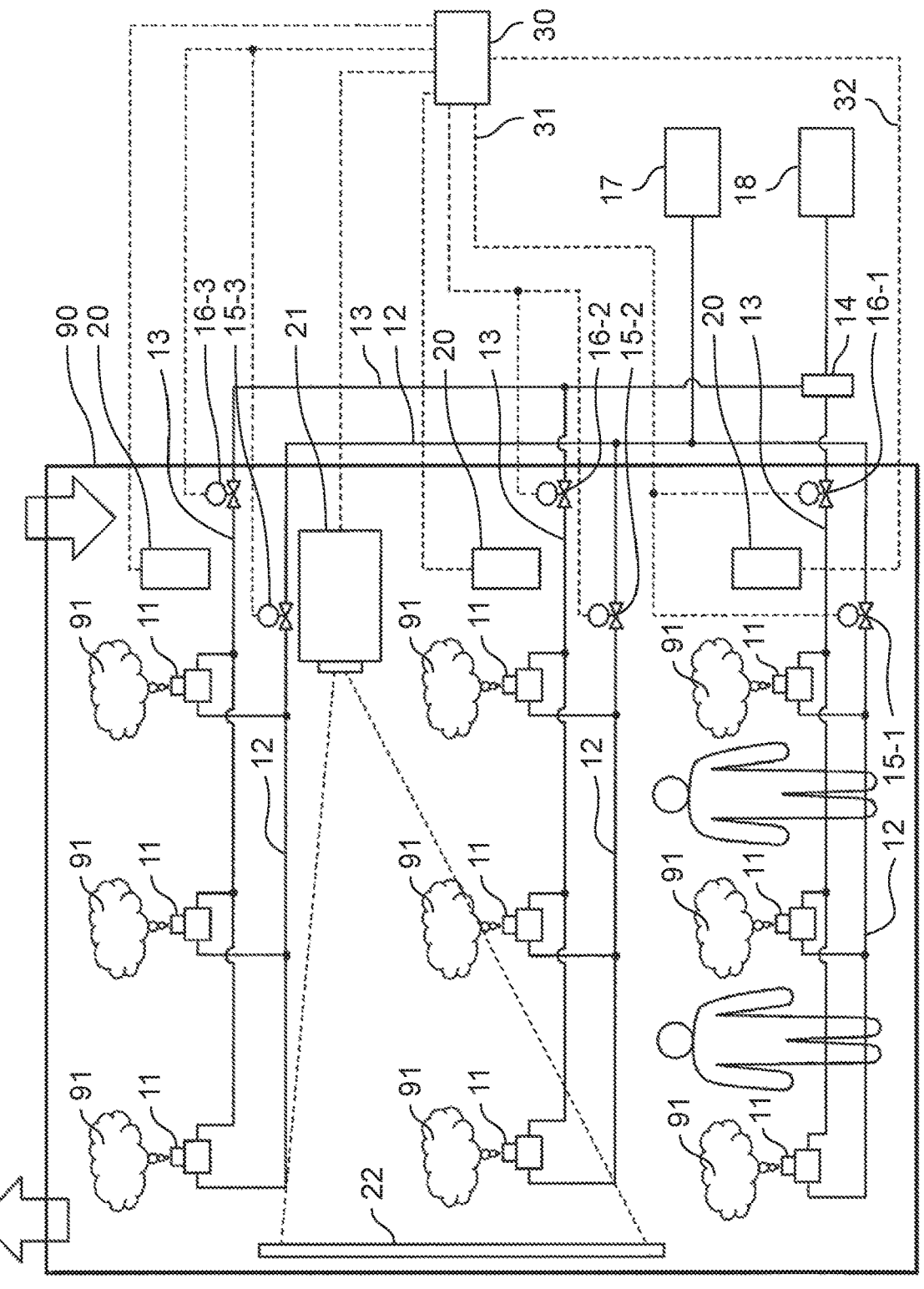
FIG. 9 is a diagram illustrating a configuration of a projection apparatus in a modification example of Exemplary Embodiment 1.
Figure 10:
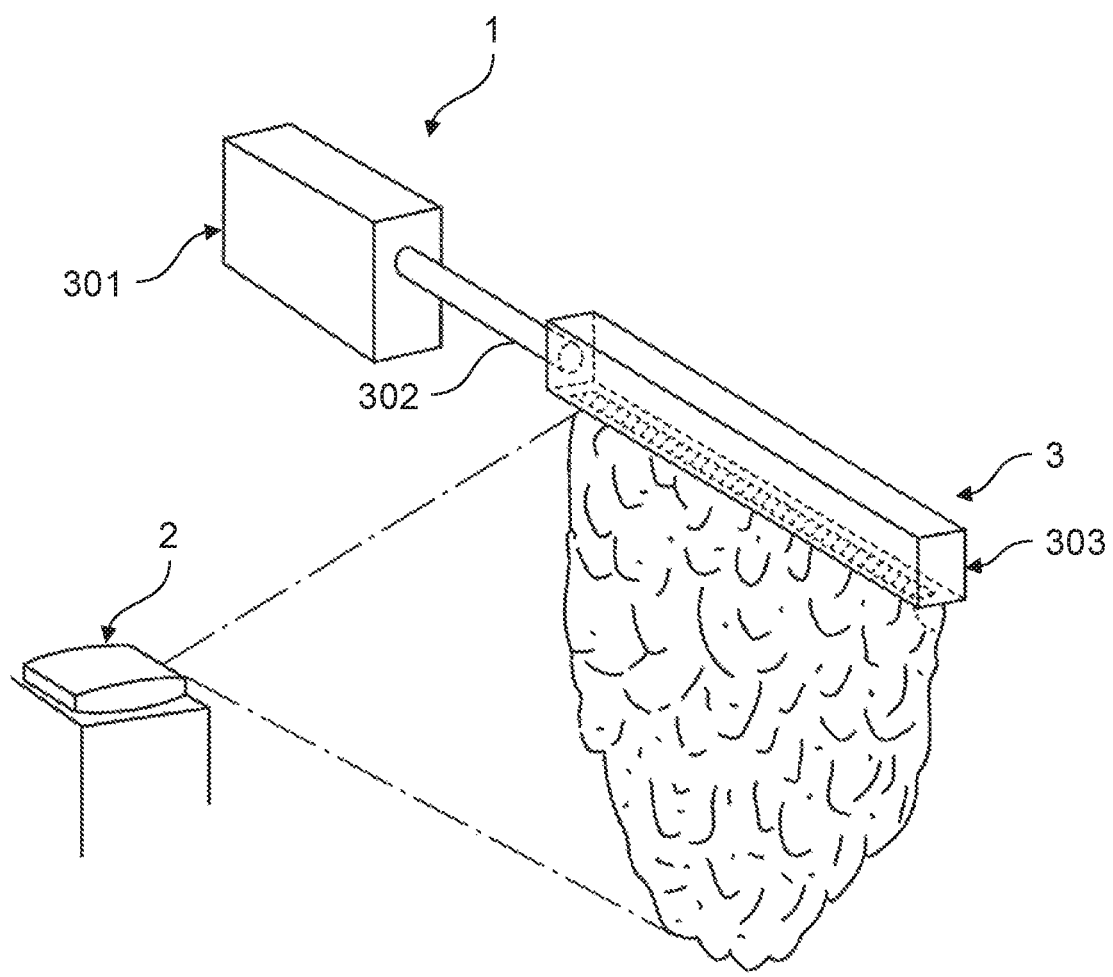
FIG. 10 is a perspective view illustrating the overall configuration of a projection apparatus of the related art.
Figure 11:
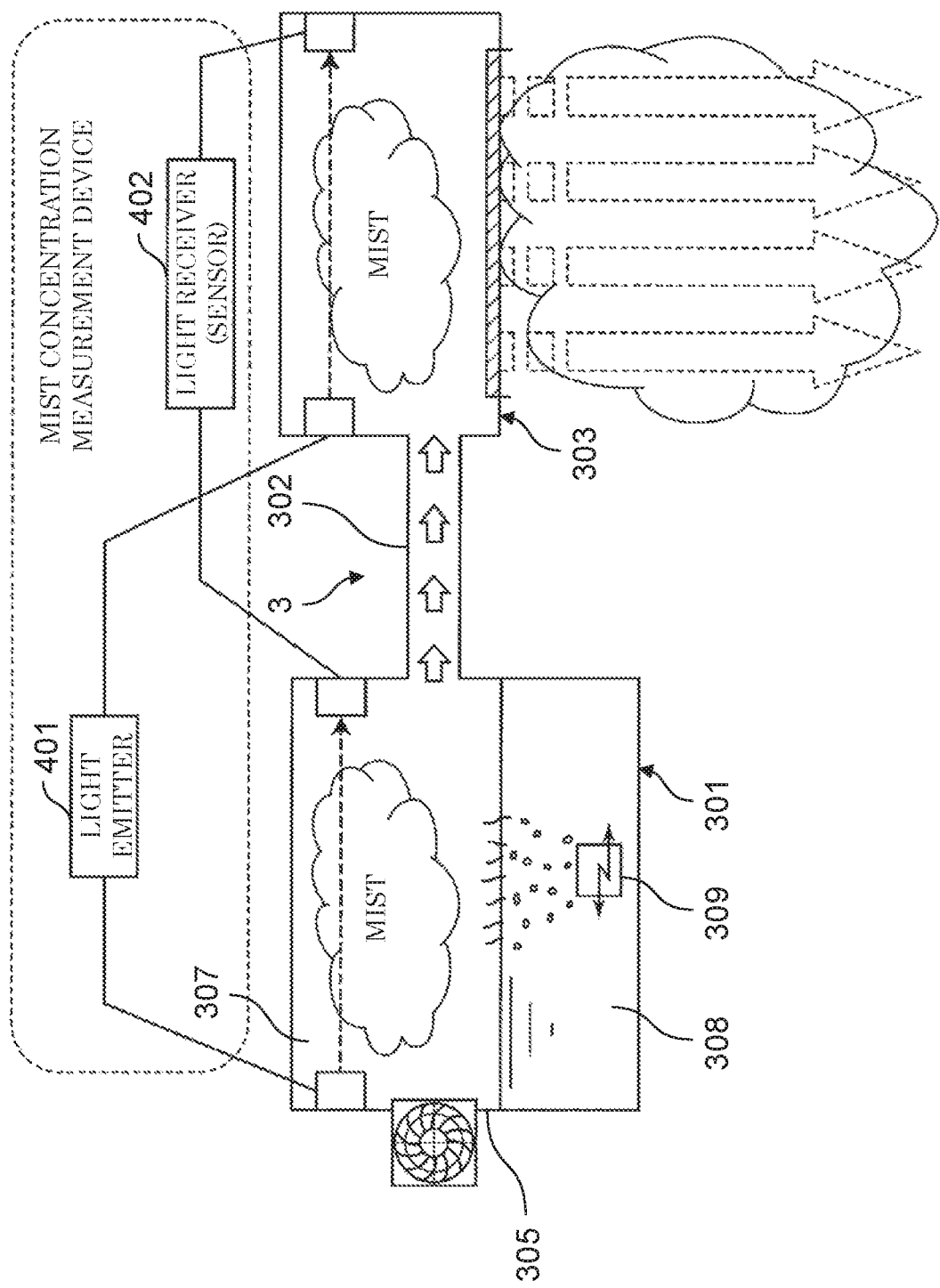
FIG. 11 is a schematic sectional view of a mist screen formation device of the related art.

An example of a specific disposition configuration for making a mist concentration distribution in indoor space 90 uniform is illustrated in FIG. 9 as Modification Example 1. FIG. 9 illustrates a case where a plurality of two-fluid nozzles 11 are provided at three types of different installation heights. Mist concentration measurers 20 are also provided at three types of different installation heights. Liquid valves 16-1, 16-2, and 16-3 are disposed for respective projection-apparatus-side-liquid-flow-paths 13 at the three types of different installation heights on the downstream side of liquid pressure adjuster 14 when viewed from liquid supply source 18. Gas valves 15-1, 15-2, and 15-3 are disposed for respective projection-apparatus-side-gas-flow-paths 12 at the three types of different installation heights.

In Modification Example 2 that is slightly different from Modification Example 1 in FIG. 9, mist concentration measurer 20 may be provided around screen 22 for each group of two-fluid nozzles 11 of which installation heights are the same as each other. For each group, gas valve 15 may be provided at projection-apparatus-side-gas-flow-path 12, and liquid valve 16 may be provided at projection-apparatus-side-liquid-flow-path 13. As mentioned above, mist concentration measurer 20 may be provided at a position close to or separated from screen 22, or at the center of indoor space 90.

Controller 30 controls opening and closing of gas valve 15 and liquid valve 16 for each group of two-fluid nozzles 11 according to a mist concentration detected by each mist concentration measurer 20 in Modification Example 1 or Modification Example 2. Consequently, a mist concentration distribution in indoor space 90 can be made uniform.

Figure 2A:
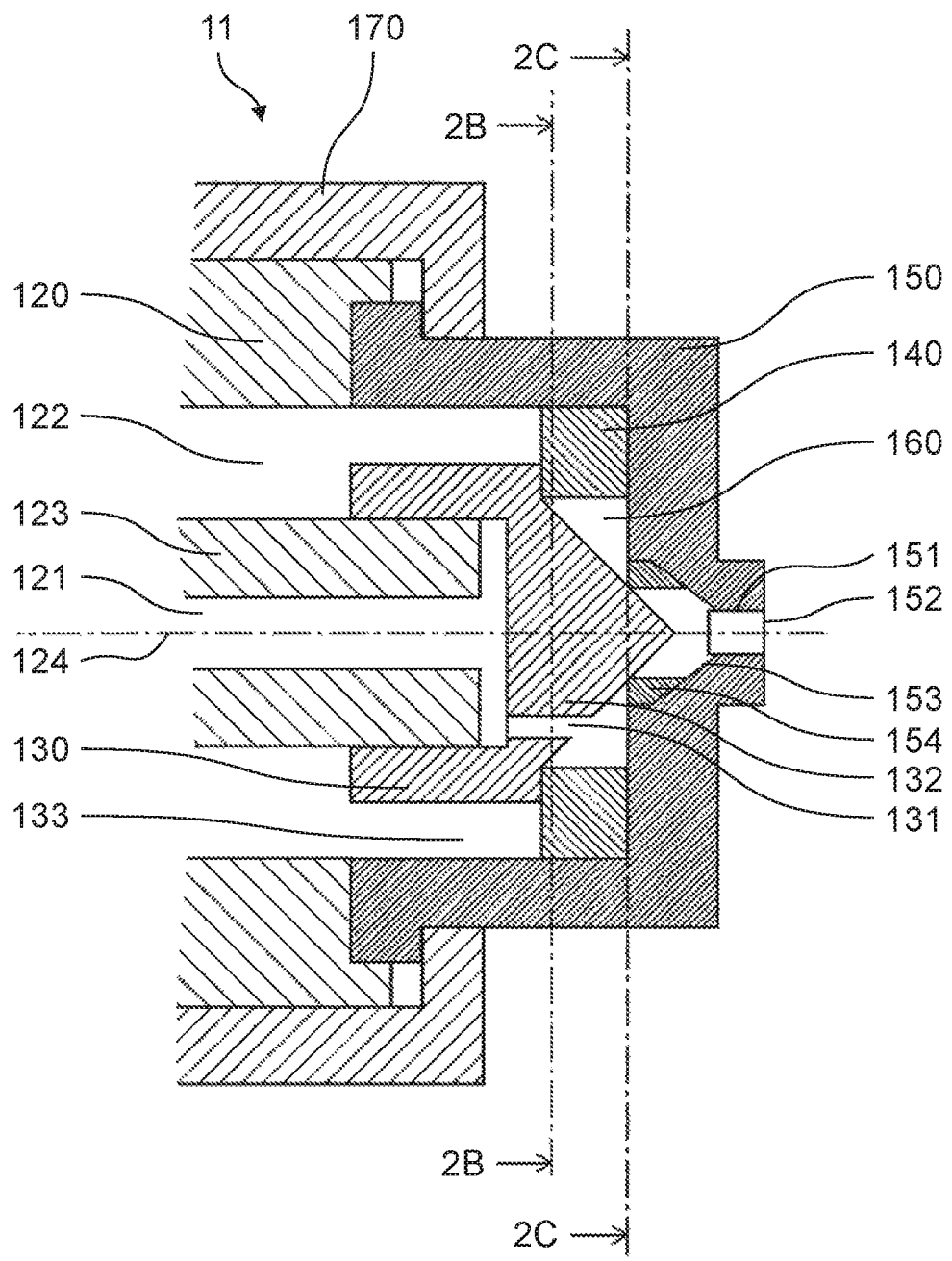
FIG. 2A is a sectional view illustrating a two-fluid nozzle in Exemplary Embodiment 1.

FIG. 2A is a sectional view illustrating two-fluid nozzle 11 in Exemplary Embodiment 1. Hereinafter, a configuration of two-fluid nozzle 11 will be described with reference to FIG. 2A.

Two-fluid nozzle 11 includes at least two-fluid nozzle main body 120, liquid introducer 130, gas introducer 140, and gas-liquid ejector 150. Gas-liquid mixer 160 is formed by liquid introducer 130, gas introducer 140, and gas-liquid ejector 150. Two-fluid nozzle 11 may further include gas-liquid ejector fixer 170.

Two-fluid nozzle main body 120 has nozzle side liquid flow path 121 and cylindrical nozzle side gas flow path 122. Nozzle side liquid flow path 121 is connected to projection-apparatus-side-liquid-flow-path 13, and is disposed along a direction of central axis 124 of a columnar member. The nozzle side gas flow path is connected to projection-apparatus-side-gas-flow-path 12, and is disposed along the axial direction around nozzle side liquid flow path 121 with a gap therewith. Nozzle side liquid flow path 121 and nozzle side gas flow path 122 are partitioned from each other by cylinder 123 located at the center as a part of two-fluid nozzle main body 120. In FIG. 2A, only a front end portion of nozzle side liquid flow path 121 is illustrated, and a liquid supply port (not illustrated) at a rear end thereof is connected to projection-apparatus-side-liquid-flow-path 13. Only a front end side of nozzle side gas flow path 122 is also illustrated, and a gas supply port (not illustrated) at a rear end thereof is connected to projection-apparatus-side-gas-flow-path 12. A front end of cylinder 123 slightly protrudes toward the front end side more than two-fluid nozzle main body 120 other than cylinder 123. Liquid introducer 130 is fixed to the front end of cylinder 123.

Liquid introducer 130 is disposed at the front end of two-fluid nozzle main body 120, and covers an opening of nozzle side liquid flow path 121 connected to projection-apparatus-side-liquid-flow-path 13. Liquid introducer 130 is provided with a groove-shaped liquid flow path on a surface in contact with an end surface of cylinder 123. Liquid inflow port 131 penetrating in the direction of central axis 124 is formed in at least one location deviated in a radial direction from central axis 124 of liquid introducer 130. In other words, liquid inflow port 131 is provided to penetrate in at least one location deviated in the radial direction from central axis 124 of liquid introducer 130. Liquid inflow port 131 is located around an inner circumferential surface of annular gas introducer 140, for example, on the upstream side of gas-liquid mixer 160. Liquid inflow port 131 allows nozzle side liquid flow path 121 and gas-liquid mixer 160 to communicate with each other, and thus a liquid flow flowing through nozzle side liquid flow path 121 flows into gas-liquid mixer 160. For example, conical protrusion 132 is provided in a tapered shape protruding toward gas-liquid mixer 160 on the front end surface of liquid introducer 130. Conical protrusion 132 protrudes along central axis 124 such that a central axis of conical protrusion 132 matches central axis 124.

Gas-liquid ejector 150 is disposed at the front end of two-fluid nozzle main body 120, and covers liquid introducer 130 and gas introducer 140. Gas-liquid ejector 150 covers the opening of nozzle side gas flow path 122, and has an axial direction section formed in a substantially Q shape. Gas-liquid ejector 150 covers liquid introducer 130 with gap 133 having a cylindrical outer shape at a predetermined interval between gas-liquid ejector 150 and liquid introducer 130. Tubular flow path 151 and ejection port 152 are formed at the front end portion of gas-liquid ejector 150. Tubular flow path 151 allows a gas-liquid mixed fluid to flow therethrough. Ejection port 152 communicates with tubular flow path 151, and ejects the gas-liquid mixed fluid. Tapered conical flow path 153 communicating with tubular flow path 151 is formed on an inner surface of gas-liquid ejector 150 on the front end portion side. Flow straightener 154 having an uneven-shaped opening is provided in tapered conical flow path 153.

A front end of conical protrusion 132 provided at liquid introducer 130 forms straightened flow outflow port 155 (refer to FIG. 2C) along with the uneven-shaped opening of flow straightener 154. A front end of the front end portion of conical protrusion 132 forms straightened flow outflow port 155 in a state of entering the uneven-shaped opening of flow straightener 154.

Gas-liquid ejector 150 is pinched and fixed between gas-liquid ejector fixer 170 and the end surface of two-fluid nozzle main body 120. Gas-liquid ejector 150 may be directly fixed on the end surface of two-fluid nozzle main body 120 without gas-liquid ejector fixer 170.

Figure 2B:
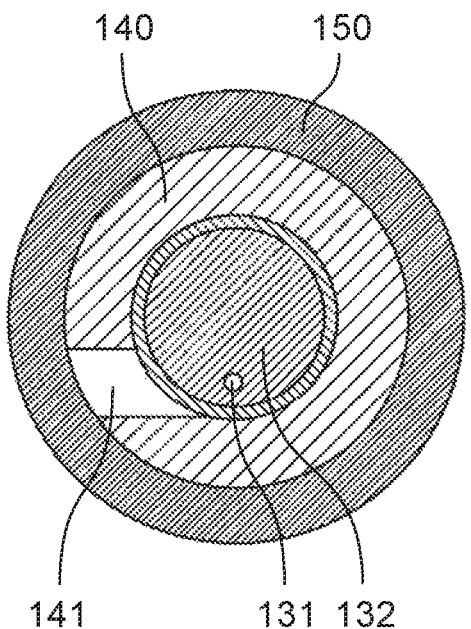
FIG. 2B is a sectional view taken along the line 2B-2B in FIG. 2A.

FIG. 2B is a sectional view of two-fluid nozzle 11 taken along the line 2B-2B in FIG. 2A. As illustrated in FIG. 2B, a notch or a gap is provided in at least one location of gas introducer 140 along a tangential direction of the inner circumference of annular gas introducer 140, and thus forms gas inflow port 141. Gas inflow port 141 communicates with nozzle side gas flow path 122, and allows a gas flow to flow into the gas introducer.

Gas inflow port 141 is disposed around liquid inflow port 131. Gas inflow port 141 is disposed such that an inflow direction of a gas flow that flows from gas inflow port 141 intersects (for example, orthogonal to) an inflow direction of a liquid flow that flows from liquid inflow port 131. The gas flow that flows from gas inflow port 141 collides with the liquid flow that flows from liquid inflow port 131, and circulates along the inner circumferential surface of annular gas introducer 140 so as to atomize the liquid.

Figure 2C:
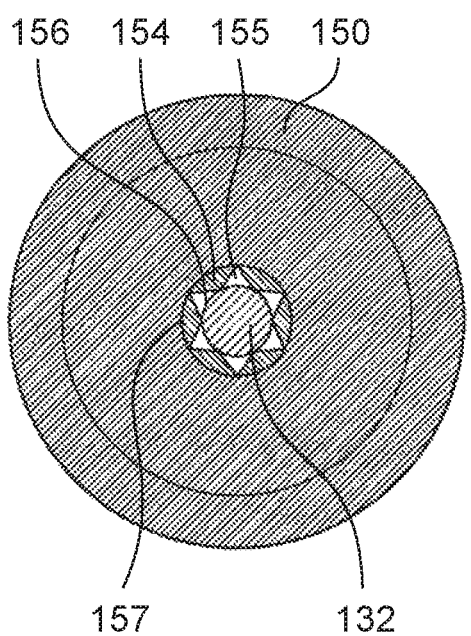
FIG. 2C is a sectional view taken along the line 2C-2C in FIG. 2A.

FIG. 2C is a sectional view of two-fluid nozzle 11 taken along the line 2C-2C in FIG. 2A. As illustrated in FIG. 2C, flow straightener 154 has the uneven-shaped opening, and straightened flow outflow port 155 is formed between the uneven-shaped opening and conical protrusion 132. The uneven-shaped opening of flow straightener 154 has a shape in which triangular teeth are engraved on an inner circumferential surface of a cylinder or a conical cylinder at a predetermined interval or uniformly, like an internal gear, the triangular teeth protrude at a predetermined interval or uniformly, and straightened flow outflow port 155 is formed between the adjacent teeth.

Here, straightened flow outflow port 155 is formed in an annular shape having an uneven shape on an outer circumference thereof in a state in which the front end portion of conical protrusion 132 enters the uneven-shaped opening of flow straightener 154. A plurality of uneven-shaped openings of flow straightener 154 are formed to be disposed around the axis of conical protrusion 132 at a predetermined interval or uniformly in an identical or similar shape, and are disposed symmetrically, for example, rotationally symmetrically with respect to the axis.

As an example of straightened flow outflow port 155, as illustrated in FIG. 2C, an inner edge of the uneven-shaped opening of flow straightener 154 is in contact with the front end portion of conical protrusion 132, and thus a plurality of triangular straightened flow outflow ports 155 partitioned from each other may be formed.

In this configuration, a liquid supplied to two-fluid nozzle 11 flows from the liquid supply port (not illustrated) to the two-fluid nozzle front end side through nozzle side liquid flow path 121 in two-fluid nozzle main body 120 and thus becomes a liquid flow. The liquid flow is supplied to gas-liquid mixer 160 through nozzle side liquid flow path 121 and liquid inflow port 131. A gas supplied to two-fluid nozzle 11 flows from the gas supply port (not illustrated) to the two-fluid nozzle front end side through nozzle side gas flow path 122 in two-fluid nozzle main body 120 and thus becomes a gas flow. The gas flow is supplied to gas-liquid mixer 160 through gap 133 and gas inflow port 141 (refer to FIG. 2B).

In a case where the liquid flow and the gas flow are supplied to gas-liquid mixer 160, the liquid flow and the gas flow are mixed with each other in gas-liquid mixer 160 such that the liquid is atomized. Thereafter, the liquid atomized through mixing is straightened through straightened flow outflow port 155 formed by the uneven-shaped opening of flow straightener 154 and conical protrusion 132, and is ejected to the outside from ejection port 152 through tubular flow path 151 provided at gas-liquid ejector 150.

Here, hereinafter, a description will be made of an atomization mechanism in gas-liquid mixer 160. The liquid flow flowing through nozzle side liquid flow path 121 flows through liquid inflow port 131 provided at liquid introducer 130. The liquid flow is supplied from the vicinity of the inner surface of annular gas introducer 140 of gas-liquid mixer 160 in a direction of gas-liquid ejector 150.

On the other hand, the gas flow supplied to gas-liquid mixer 160 through gas inflow port 141 collides with the liquid flow supplied to gas-liquid mixer 160 from liquid inflow port 131, and circulates along the inner circumferential surface of annular gas introducer 140. Through the collision, the liquid is expanded on the inner circumferential surface of annular gas introducer 140 and thus becomes a thin film. The liquid flows in the circumferential direction along the inner circumferential surface of annular gas introducer 140, and thus changes from the thin film to fine liquid droplets. A gas-liquid mixed fluid containing the liquid droplets is stirred in gas-liquid mixer 160 such that the liquid droplets can be further atomized, and thus a liquid having a smaller average particle size can be sprayed from ejection port 152.

Specifically, annular gas introducer 140 forming gas-liquid mixer 160 has an inner diameter of 6.0 mm and a height of 1.9 mm. Inscribed circle 156 of the uneven-shaped opening of flow straightener 154 has a diameter of 1.9 mm, circumscribed circle 157 of the opening has a diameter of 2.8 mm, and an area of the opening is 4.52 mm². Tubular flow path 151 of gas-liquid ejector 150 has a diameter of 1.0 mm, and a sectional area of the flow path is 0.79 mm². A diameter of liquid inflow port 131 is 0.6 mm. A flow path section of gas inflow port 141 in an axis orthogonal direction is rectangular, and has a width of 2.0 mm and a height of 1.0 mm. A diameter of a bottom surface of conical protrusion 132 is 6 mm, and a height of conical protrusion 132 is 2.8 mm. An opening area of straightened flow outflow port 155 is 1.6 mm².

Compressed air as an example of a gas is supplied to the gas supply port of two-fluid nozzle 11 under the pressure of 0.5 MPa (gauge pressure), and water as an example of a liquid is supplied to the liquid supply port of two-fluid nozzle 11 under the pressure of 0.509 MPa (gauge pressure). A Sauter mean diameter of an atomized liquid was evaluated in this condition according to a laser diffraction method. A measurement distance in the laser diffraction method was a position of 300 mm from the front end of two-fluid nozzle 11, and the Sauter mean diameter was 6.0 am.

Two-fluid nozzle 11 may change a spraying amount of mist 91 by changing a pressure of the supplied compressed air and a pressure of the supplied water. FIG. 3 illustrates a relationship between a pressure of water at the liquid supply port of two-fluid nozzle 11 and a spraying amount of mist 91 in a case where compressed air with 0.5 MPa is supplied to the gas supply port of two-fluid nozzle 11. A spraying amount of mist 91 increases in proportion to an increase in a pressure of the water.

On the other hand, in a case where an installation height of two-fluid nozzle 11 is changed, potential energy of the supplied water is changed. Thus, in order to make spraying amounts of mist 91 of two-fluid nozzles 11 at different heights the same as each other, a setting pressure in liquid pressure adjuster 14 is required to be set for each group of two-fluid nozzles 11 at the different heights.

FIG. 4 illustrates a relationship between an installation height of two-fluid nozzle 11 and a setting pressure in liquid pressure adjuster 14 in a case where compressed air with 0.5 MPa is supplied to the gas supply port of two-fluid nozzle 11, and a spraying amount is 50 ml/min. A setting pressure in liquid pressure adjuster 14 is set for each group of two-fluid nozzles 11 at different heights, and thus a pressure of water at the liquid supply port of two-fluid nozzle 11 is 0.509 MPa such that a uniform spraying amount of mist 91 can be obtained. Here, the installation height of two-fluid nozzle 11 indicates a height of the front end of two-fluid nozzle 11.

Figure 5A:
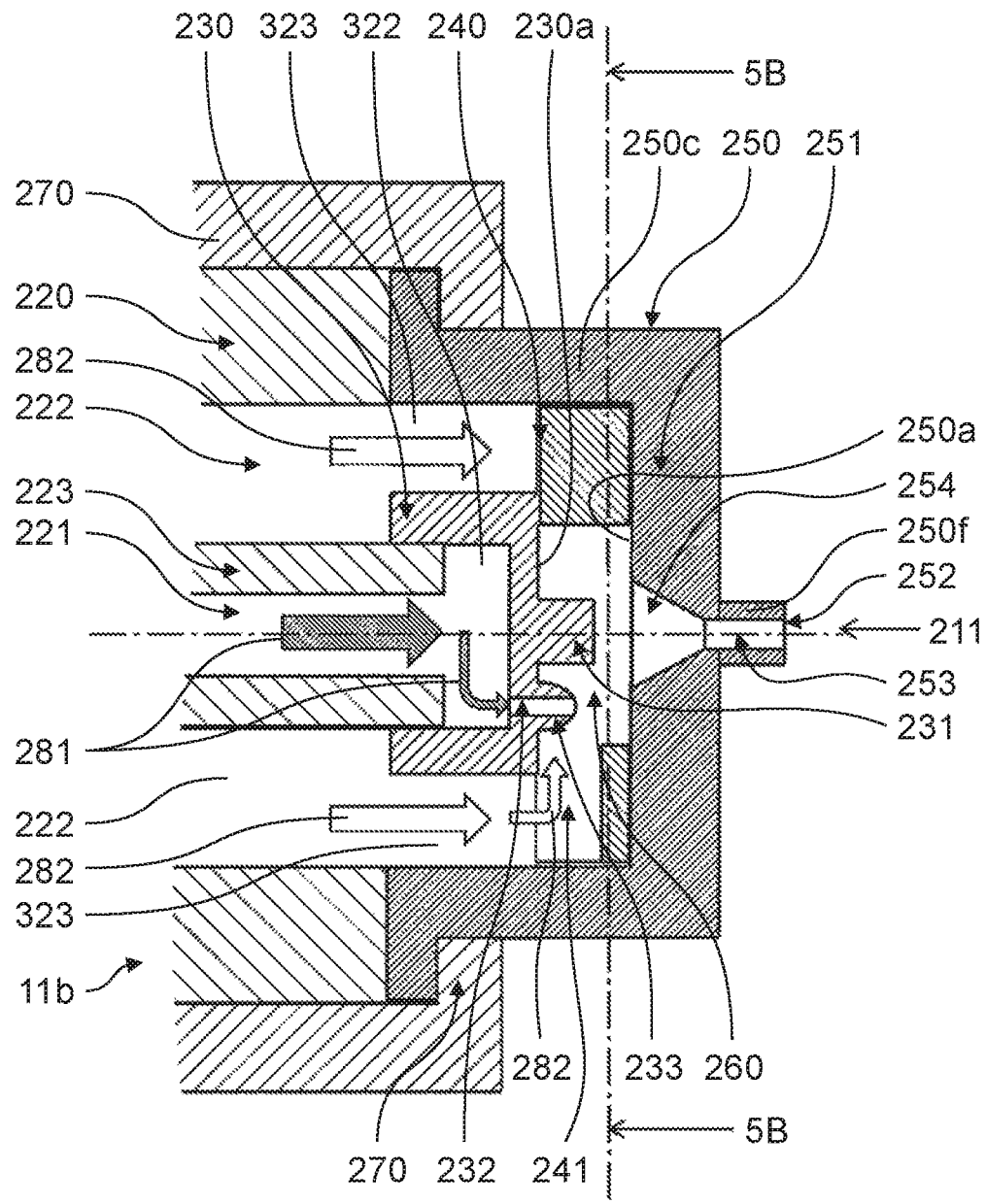
FIG. 5A is a sectional view illustrating a two-fluid nozzle in Exemplary Embodiment 2.

According to the configuration, it is possible for controller 30 to control opening and closing of gas valve 15 and liquid valve 16 and thus to spray mist 91 in which a liquid is atomized into indoor space 90 by using two-fluid nozzle 11. Consequently, it is possible to control a mist concentration in indoor space 90. As a result, for example, a mist concentration distribution in indoor space 90 can be made uniform, and fantastic and comfortable indoor space 90 can be realized by projecting an image or a video onto screen 22 through indoor space 90 and scattering light of the image or the video in mist 91.

Exemplary Embodiment 2

FIG. 5A is a sectional view illustrating two-fluid nozzle 11*b* in Exemplary Embodiment 2. In FIG. 5A, hatched thick arrow 281 indicates a direction of a flow of a liquid in two-fluid nozzle 11*b*, and white thick arrow 282 indicates a direction of a flow of a gas in two-fluid nozzle 11*b*.

Two-fluid nozzle 11*b* includes at least two-fluid nozzle main body 220, liquid introducer 230, gas introducer 240, and gas-liquid ejector 250. Gas-liquid mixer 260 is formed by liquid introducer 230, gas introducer 240, and gas-liquid ejector 250. Two-fluid nozzle 11*b* further includes gas inflow path 241, liquid inflow path 232, ejection port 252, and projection 233. Two-fluid nozzle 11*b* may further include gas-liquid ejector fixer 270.

Two-fluid nozzle main body 220 has nozzle side liquid flow path 221 and cylindrical nozzle side gas flow path 222. Nozzle side liquid flow path 221 is connected to projection-apparatus-side-liquid-flow-path 13, and is disposed at the center of a columnar member along a direction of central axis 211. The nozzle side gas flow path 222 is connected to projection-apparatus-side-gas-flow-path 12, and is disposed along the direction of central axis 211 around nozzle side liquid flow path 221 with a gap therewith. Nozzle side liquid flow path 221 and nozzle side gas flow path 222 are partitioned from each other by cylinder 223 located at the center as a part of two-fluid nozzle main body 220. In FIG. 5A, only a front end of nozzle side liquid flow path 221 is illustrated, and a liquid supply port (not illustrated) at a rear end thereof is connected to projection-apparatus-side-liquid-flow-path 13. Only a front end of nozzle side gas flow path 222 is also illustrated, and a gas supply port (not illustrated) at a rear end thereof is connected to projection-apparatus-side-gas-flow-path 12.

A front end of cylinder 223 slightly protrudes toward the front end side more than two-fluid nozzle main body 220 other than cylinder 223. Liquid introducer 230 is fixed to the front end of cylinder 223.

Liquid introducer 230 is disposed at the front end of two-fluid nozzle main body 220, and covers an opening of nozzle side liquid flow path 221. Liquid introducer 230 has a section formed in a substantially C shape having planar inner end surface (that is, downstream side end surface) 230a. First gap 322 having a disk shape as an outer shape is formed between the end surface of cylinder 223 and an inner surface on the upstream side opposite to inner end surface 230a of liquid introducer 230 in the axial direction.

Projection 233 that projects at a predetermined protrusion height which will be described later toward the downstream side from inner end surface 230a is formed at one location of a downstream side end surface of liquid introducer 230, that is, inner end surface 230a. As an example, the projection 233 has a semi-spherical shape with a curved outer shape that is tapered toward the downstream side.

Liquid inflow path 232 is formed to penetrate through liquid introducer 230 and projection 233 in the axial direction such that nozzle side liquid flow path 221 communicates with gas-liquid mixer 260. Liquid inflow path 232 is disposed at a position deviated from central axis 211, that is, a position deviated outward from a region along the axial direction of nozzle side liquid flow path 221, for example, on the outer circumferential side of first gap 322.

Protrusion 231 that protrudes toward gas-liquid mixer 260 and is disposed on the same axis as central axis 211 is provided on the downstream side end surface of liquid introducer 230.

Gas introducer 240 is located between liquid introducer 230 and gas-liquid ejector 250, and is an annular member that is in surface contact with liquid introducer 230 and gas-liquid ejector 250. Gas introducer 240 is provided with gas inflow path 241 through which nozzle side gas flow path 222 communicates with gas-liquid mixer 260 by notching a part of the side of the annular member in a direction (for example, an axis orthogonal direction) intersecting the axial direction. Gas inflow path 241 is provided in at least one location of annular gas introducer 240 such that nozzle side gas flow path 222 communicates with gas-liquid mixer 260. Gas inflow path 241 is disposed such that an inflow direction of a liquid flow that flows into gas-liquid mixer 260 from liquid inflow path 232 intersects an inflow direction of a gas flow that flows into gas-liquid mixer 260 from nozzle side gas flow path 222 at gas-liquid mixer 260. As mentioned above, a gas and a liquid are made to flow into gas-liquid mixer 260 through intersection, and thus the liquid is atomized. Gas inflow path 241 is located at a position at which the same phase as in the position of liquid inflow path 232 does not occur with respect to the center (central axis 211) of two-fluid nozzle main body 220, but a central axis (on the axis of gas inflow path 241) 300 (refer to FIG. 5B) of gas inflow path 241 along the direction (for example, an orthogonal direction) intersecting central axis 211 intersects a central axis parallel to central axis 211 of liquid inflow path 232 around liquid inflow path 232. Thus, a liquid flow from liquid inflow path 232 can be reliably mixed with a gas from gas inflow path 241.

Gas-liquid ejector 250 has a section formed in a substantially Q shape, and is disposed at the front end of two-fluid nozzle main body 220 to cover liquid introducer 230 and gas introducer 240. Gas-liquid ejector 250 covers an opening of nozzle side gas flow path 222 and thus forms second gap 323 having a cylindrical outer shape. Gas-liquid ejector 250 has outer end 250a that has a planar outer end surface 250a facing inner end surface 230a of liquid introducer 230, and gas-liquid ejector side surface 250c corresponding to a cylinder side surface. Gas-liquid ejector 250 covers liquid introducer 230 with second gap 323 having a cylindrical outer shape at a predetermined interval between gas-liquid ejector 250 and liquid introducer 230. Gas-liquid mixer 260 of a space having a disk shape as an outer shape at a predetermined interval is formed as a gap at an end between gas-liquid ejector 250 and liquid introducer 230. Gas-liquid ejector 250 is pinched and fixed between the end surface of two-fluid nozzle main body 220 and gas-liquid ejector fixer 270 so as to cover liquid introducer 230. Gas-liquid ejector 250 may be directly fixed on the end surface of two-fluid nozzle main body 220 without gas-liquid ejector fixer 270.

Ejection cylinder 250f in which the center of front end portion 251 of gas-liquid ejector 250 protrudes is provided with tubular flow path 253 and ejection port 252. A gas-liquid mixed fluid (that is, an atomized liquid) flows out of gas-liquid mixer 260 through tubular flow path 253. Ejection port 252 communicates with tubular flow path 253, and ejects the gas-liquid mixed fluid. Flow straightening path 254 that communicates with tubular flow path 253 and has a tubularly truncated cone shape is formed on the inner surface of front end portion 251. Flow straightening path 254 faces protrusion 231 on central axis 211. In other words, both ejection port 252 and tubular flow path 253 are disposed on the same central axis 211 as that of nozzle side liquid flow path 221. In contrast, liquid inflow path 232 is located at the position deviated from central axis 211.

Figure 5B:
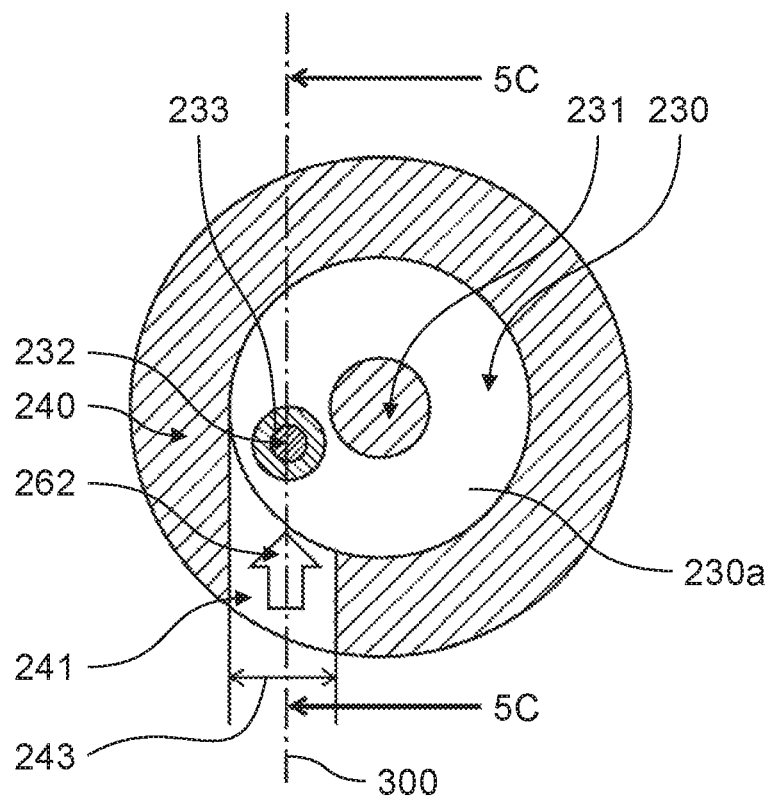
FIG. 5B is an enlarged sectional view of a gas-liquid mixer of the two-fluid nozzle illustrated in FIG. 5A, taken along the line 5B-5B.
Figure 5C:
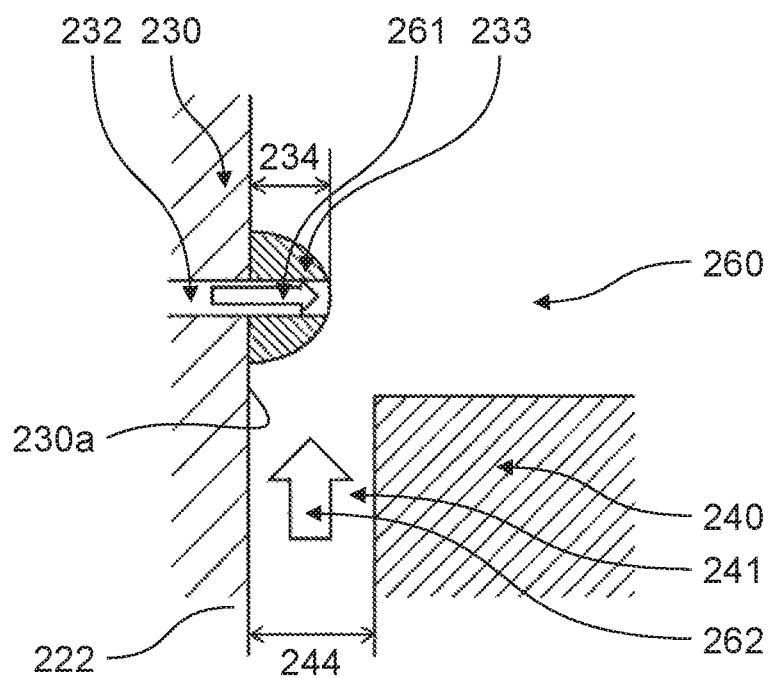
FIG. 5C is a sectional view of the gas-liquid mixer illustrated in FIG. 5B, taken along the line 5C-5C.

FIG. 5B is an enlarged sectional view of gas-liquid mixer 260 of two-fluid nozzle 11b illustrated in FIG. 5A, taken along the line 5B-5B. FIG. 5C is a sectional view of gas-liquid mixer 260 illustrated in FIG. 5B, taken along the line 5C-5C.

Gas inflow path 241 is formed by notching at least one location of annular gas introducer 240 in a rectangular sectional shape with groove width 243 and groove height 244, and is disposed along a tangential direction of the inner circumference of annular gas introducer 240.

Liquid inflow path 232 is disposed such that gas flow 262 flowing through gas inflow path 241 intersects liquid flow 261 flowing through liquid inflow path 232 around the inner circumferential surface of annular gas introducer 240.

Projection 233 is disposed around the liquid inflow path, and projects from inner end surface 230a of liquid introducer 230 at a predetermined protrusion height. Here, a distance between the front end of projection 233 and inner end surface 230a of liquid introducer 230 will be referred to as "projection height" 234. Here, projection 233 may be disposed between liquid inflow path 232 and gas inflow path 241. Projection 233 and may be formed to cover liquid inflow path 232 as illustrated in FIG. 5C.

In this configuration, a liquid supplied to two-fluid nozzle 11b from projection-apparatus-side-liquid-flow-path 13 flows from the liquid supply port (not illustrated) to the two-fluid nozzle front end side through nozzle side liquid flow path 221 in two-fluid nozzle main body 220 and thus becomes liquid flow 261. Liquid flow 261 is supplied to gas-liquid mixer 260 through liquid inflow path 232 of liquid introducer 230. A gas supplied to two-fluid nozzle 11b from projection-apparatus-side-gas-flow-path 12 flows from the gas supply port (not illustrated) to the two-fluid nozzle front end side through nozzle side gas flow path 222 in two-fluid nozzle main body 220 and thus becomes gas flow 262. Gas flow 262 is supplied to gas-liquid mixer 260 through gas inflow path 241.

In a case where gas flow 262 is supplied to gas-liquid mixer 260, gas flow 262 collides with projection 233 disposed in gas-liquid mixer 260, and thus a flow of the gas is changed to follow the surface of projection 233. The gas flowing along the surface of projection 233 is decelerated due to friction with the surface of projection 233, and a speed thereof becomes zero at a certain point. This point is referred to as a peeling point, the stagnation of an airflow occurs downstream of the peeling point, and thus a pressure of a space downstream of the peeling point in gas-liquid mixer 260 is reduced. In Exemplary Embodiment 2, the peeling point around a vertex of projection 233 is caused to occur, and thus the pressure of the space is reduced. Consequently, a liquid can be supplied under a lower liquid feed pressure in liquid inflow path 232 disposed around projection 233. In a case where gas flow 262 and liquid flow 261 are supplied to gas-liquid mixer 260, the gas flow and the liquid flow are mixed with each other such that the liquid is atomized.

Consequently, two-fluid nozzle 11b according to Exemplary Embodiment 2 can efficiently atomize a liquid up to a small size, for example, an average particle size (that is, a Sauter mean diameter which will be described later) of about 10 μm or less by using a gas. It is possible to reduce a supplied liquid pressure during spraying by reducing the pressure of the space around liquid inflow path 232. Therefore, a pressure increasing pump and a pressurizing tank for increasing pressure are not necessary, and thus it is possible to provide two-fluid nozzle lib of which a usage place or an application is not restricted.

Two-fluid nozzle 11b in one Example of Exemplary Embodiment 2 may have the following specific configuration as an example. However, this is only an example. For example, gas-liquid mixer 260 has a cylindrical shape with an inner diameter of 6.0 mm and a height of 1.9 mm. A diameter of ejection port 252 of the ejector is 1.0 mm. Tubular flow path 253 has a diameter of 1.0 mm and a length of 1.0 mm. Truncated conic-shaped flow straightening path 254 has a diameter of a wide surface of 3.0 mm, a diameter of a narrow surface of 1.0 mm, and a length of 2.0 mm. Projection 233 has a semi-spherical shape with a radius of 0.4 mm, and projection height 234 of 0.4 mm. Liquid inflow path 232 has a circular sectional shape with a diameter of 0.6 mm, and is formed at one location on the axis of gas inflow path 241. Gas inflow path 241 has a rectangular sectional shape with groove width 243 of 1.0 mm and groove height 244 of 0.5 mm, and is formed at one location along the tangential direction of the inner circumference of gas introducer 240.

Compressed air as an example of a gas is supplied to the gas supply port of two-fluid nozzle 11b under the pressure of 0.5 MPa (gauge pressure), and water as an example of a liquid is supplied to have a flow rate of 50 ml/min. A Sauter mean diameter of atomized water was evaluated in this condition according to a laser diffraction method, and a pressure of the water at the liquid supply port of two-fluid nozzle 11b was measured by using a pressure gauge. A measurement distance in the laser diffraction method was a position of 300 mm from the front end of two-fluid nozzle 11b. The Sauter mean diameter was 5.4 μm. The pressure of the water at the liquid supply port of two-fluid nozzle 11b was 0.286 MPa (gauge pressure).

The Sauter mean diameter indicates a particle diameter having the same ratio between a surface area and a volume as a ratio of a total volume of all particles to a total surface area of all the particles. In a case where there are $n_i$ particles with a diameter $d_i$, the Sauter mean diameter (generally indicated by $D_{32}$) is given by the following equation.

$$D_{32} = \Sigma n_i d_i^3 / \Sigma n_i d_i^2$$

FIG. 6 illustrates a relationship between a pressure of water at the liquid supply port of two-fluid nozzle 11b and a spraying amount of a mist in a case where compressed air with 0.5 MPa is supplied to the gas supply port of two-fluid nozzle 11b. Compared with two-fluid nozzle 11 in FIG. 3, two-fluid nozzle 11b can spray a mist in the same mist spraying amount under a low pressure of the water, and thus a variation in a mist spraying amount due to a difference between the pressures of the water is small.

For example, FIG. 7 illustrates a relationship between a pressure of water at the liquid supply port of the two-fluid nozzle and a mist spraying amount for an installation height of the two-fluid nozzle when a pressure of air at each gas supply port is 0.5 MPa, and setting pressures in the liquid pressure adjuster are respectively 0.524 MPa and 0.301 MPa in two-fluid nozzle 11 and two-fluid nozzle 11b.

At an installation height of 0.5 m to 3.5 m, in two-fluid nozzle 11, a mist spraying amount varies from 0 to 78 ml/min but, in two-fluid nozzle 11b, a mist spraying amount varies from 41 ml/min to 58 ml/min, and thus a variation width thereof is small.

As mentioned above, a mist spraying amount of two-fluid nozzle 11b of Exemplary Embodiment 2 is less influenced by a water pressure difference at the liquid supply port of two-fluid nozzle 11b. Thus, setting pressures of all groups of two-fluid nozzles 11b at different heights can be collectively set by liquid pressure adjuster 14 provided at projection-apparatus-side-liquid-flow-path 13 around liquid supply source 18, and thus a spraying amount of mists from two-fluid nozzles 11b at different heights can be made uniform.

According to this configuration, it is possible for controller 30 to control opening and closing of gas valve 15 and liquid valve 16 and thus to spray mist 91 in which a liquid is atomized into indoor space 90 by using two-fluid nozzle 11b such that a mist concentration in indoor space 90 can be controlled. As a result, for example, a mist concentration distribution in indoor space 90 can be made uniform, and fantastic and comfortable indoor space 90 can be realized by projecting an image or a video onto screen 22 through indoor space 90 and scattering light of the image or the video in mist 91.

Any exemplary embodiments or modification examples of the various exemplary embodiments or modification examples may be combined with each other as appropriate, and thus each effect thereof may be achieved. A combination of exemplary embodiments, a combination of Examples, or a combination of an exemplary embodiment and an Example may occur, and features in different exemplary embodiments or Examples may be combined with each other.

The projection apparatus according to the aspect of the present disclosure can control a mist concentration in an indoor space by spraying a mist in which a liquid is atomized into the indoor space by using a two-fluid nozzle. As a result, for example, a mist concentration distribution in the indoor space can be made uniform, and the fantastic and comfortable indoor space can be realized by projecting an image or a video onto a screen through the indoor space and scattering light of the image or the video in the mist. Therefore, the projection apparatus can be applied to applications such as art or entertainment.

What is claimed is:

1. A projection apparatus that projects an image or a video onto a screen disposed in an indoor space, the projection apparatus comprising:
    a plurality of two-fluid nozzles each of which mixes a liquid with a gas, and sprays a mist in which the liquid is atomized;
    a projection-apparatus-side-gas-flow-path through which the gas is supplied to the plurality of two-fluid nozzles;
    a gas valve that opens and closes the projection-apparatus-side-gas-flow-path;
    a gas supply source that supplies the gas to the projection-apparatus-side-gas-flow-path;
    a projection-apparatus-side-liquid-flow-path through which the liquid is supplied to the plurality of two-fluid nozzles;
    a liquid valve that opens and closes the projection-apparatus-side-liquid-flow-path;
    a liquid supply source that supplies the liquid to the projection-apparatus-side-liquid-flow-path;
    a liquid pressure adjuster that is provided at the projection-apparatus-side-liquid-flow-path between the plurality of two-fluid nozzles and the liquid valve;
    a projector that projects the image or the video onto the screen;
    a mist concentration measurer that measures a mist concentration in the indoor space in which the mist is sprayed; and
    a controller that starts and stops spraying of the mist by controlling the gas valve and the liquid valve on the basis of the image or the video projected onto the screen from the projector, receives a signal indicating the mist concentration from the mist concentration measurer, and starts and stops spraying of the mist by controlling the gas valve and the liquid valve on the basis of the received signal, and thus controls the mist concentration,
    wherein the two-fluid nozzle includes:
        a two-fluid nozzle main body that has a nozzle side liquid flow path and a nozzle side gas flow path,
        a liquid introducer that is connected to the projection-apparatus-side-liquid-flow-path and is provided at an end of the nozzle side liquid flow path,
        an annular gas introducer that is connected to the projection-apparatus-side-gas-flow-path and is provided at an end of the nozzle side gas flow path,
        a gas-liquid ejector that covers the liquid introducer and the gas introducer,
        a liquid inflow port that is provided to communicate with the nozzle side liquid flow path in at least one location of the liquid introducer, and allows a liquid flow to flow into a gas-liquid mixer that is a space inside the annular gas introducer, and
        a gas inflow port that is provided to communicate with the nozzle side gas flow path in at least one location of the annular gas introducer, and allows a gas flow to flow into the gas-liquid mixer, and
    wherein the gas inflow port is disposed such that an inflow direction of the gas flow that flows from the gas inflow port intersects, at the gas-liquid mixer of the two-fluid nozzle, an inflow direction of the liquid flow that flows from the liquid inflow port.

2. The projection apparatus of claim 1,
    wherein the liquid pressure adjuster sets a pressure of the liquid for each group of two-fluid nozzles at a substantially identical installation height among the plurality of two-fluid nozzles.

3. The projection apparatus of claim 1, wherein the two-fluid nozzle further includes:
    a tubular flow path that is provided to penetrate through the gas-liquid ejector, mixes the gas flow flowing out of the gas inflow port with the liquid flow flowing out of the liquid inflow port, and allows a gas-liquid mixed fluid in which the liquid is atomized to flow out of the tubular flow path;
    an ejection port that is provided at the gas-liquid ejector to communicate with the tubular flow path, and ejects the gas-liquid mixed fluid;
    a tapered flow path that is provided at the gas-liquid ejector, and communicates with the ejection port;
    a flow straightener that has an uneven-shaped opening provided at the tapered flow path; and
    a protrusion that is provided at the liquid introducer, protrudes toward the gas-liquid mixer, and forms a straightened flow outflow port along with the flow straightener having the uneven-shaped opening.

4. The projection apparatus of claim 1,
    wherein the gas inflow port is disposed such that the inflow direction of the gas flow is orthogonal to the inflow direction of the liquid flow.

5. A projection apparatus that projects an image or a video onto a screen disposed in an indoor space, the projection apparatus comprising:
    a plurality of two-fluid nozzles each of which mixes a liquid with a gas, and sprays a mist in which the liquid is atomized;
    a projection-apparatus-side-gas-flow-path through which the gas is supplied to the plurality of two-fluid nozzles;
    a gas valve that opens and closes the projection-apparatus-side-gas-flow-path;
    a gas supply source that supplies the gas to the projection-apparatus-side-gas-flow-path;
    a projection-apparatus-side-liquid-flow-path through which the liquid is supplied to the plurality of two-fluid nozzles;
    a liquid valve that opens and closes the projection-apparatus-side-liquid-flow-path;
    a liquid supply source that supplies the liquid to the projection-apparatus-side-liquid-flow-path;
    a liquid pressure adjuster that is provided at the projection-apparatus-side-liquid-flow-path between the plurality of two-fluid nozzles and the liquid valve;
    a projector that projects the image or the video onto the screen;
    a mist concentration measurer that measures a mist concentration in the indoor space in which the mist is sprayed; and
    a controller that starts and stops spraying of the mist by controlling the gas valve and the liquid valve on the basis of the image or the video projected onto the screen from the projector, receives a signal indicating the mist concentration from the mist concentration measurer, and starts and stops spraying of the mist by controlling the gas valve and the liquid valve on the basis of the received signal, and thus controls the mist concentration, wherein the two-fluid nozzle includes:
- a two-fluid nozzle main body that has a nozzle side liquid flow path and a nozzle side gas flow path;
- a liquid introducer that is connected to the projection-apparatus-side-liquid-flow-path, is provided at a front end of a cylinder located on a central axis of the two-fluid nozzle main body, and covers an opening of the nozzle side liquid flow path;
- a gas-liquid ejector that is connected to the projection-apparatus-side-gas-flow-path, is disposed at a front end of the two-fluid nozzle main body, covers the liquid introducer, and covers an opening of the nozzle side gas flow path;
- an annular gas introducer that is located between the liquid introducer and the gas-liquid ejector, and is in surface contact with the liquid introducer and the gas-liquid ejector;
- a liquid inflow path through which the opening of the liquid flow path covered with the liquid introducer communicates with a gas-liquid mixer surrounded by the liquid introducer, the gas introducer, and the gas-liquid ejector;
- a gas inflow path that is provided in at least one location of the annular gas introducer such that the nozzle side gas flow path communicates with the gas-liquid mixer, and atomizes a liquid by allowing a gas flow flowing through the nozzle side gas flow path to flow into the gas-liquid mixer in a direction of intersecting a liquid flow flowing into the gas-liquid mixer from the liquid inflow path;
- an ejection port that is provided at the gas-liquid ejector, communicates with the gas-liquid mixer, and ejects the liquid atomized in the gas-liquid mixer; and
- a projection that protrudes from a downstream side end surface of the liquid introducer and is disposed around the liquid inflow path, and wherein the gas inflow path is disposed such that an inflow direction of the liquid flow that flows from the liquid inflow path intersects, at the gas-liquid mixer of the two fluid nozzle, an inflow direction of the gas flow that flows from the gas inflow path.

6. The projection apparatus of claim 5 wherein the two-fluid nozzle further includes:
- an ejection port that is provided at the gas-liquid ejector, communicates with the gas-liquid mixer, and ejects the liquid atomized in the gas-liquid mixer; and
- a projection that protrudes from a downstream side end surface of the liquid introducer and is disposed around the liquid inflow path.

7. The projection apparatus of claim 6, wherein the ejection port is located along the central axis of the two-fluid nozzle main body, and the liquid inflow path is located along an axis deviated from the central axis.

8. The projection apparatus of claim 5, wherein the liquid pressure adjuster sets a pressure of the liquid for each group of two-fluid nozzles at a substantially identical installation height among the plurality of two-fluid nozzles.

9. The projection apparatus of claim 5, wherein the gas inflow path is disposed such that the inflow direction of the liquid flow is orthogonal to the inflow direction of the gas flow.

* * * * *